Oct. 22, 1929.                E. TIEDEMANN                1,732,546
                                PROTRACTOR
                            Filed Dec. 23, 1927
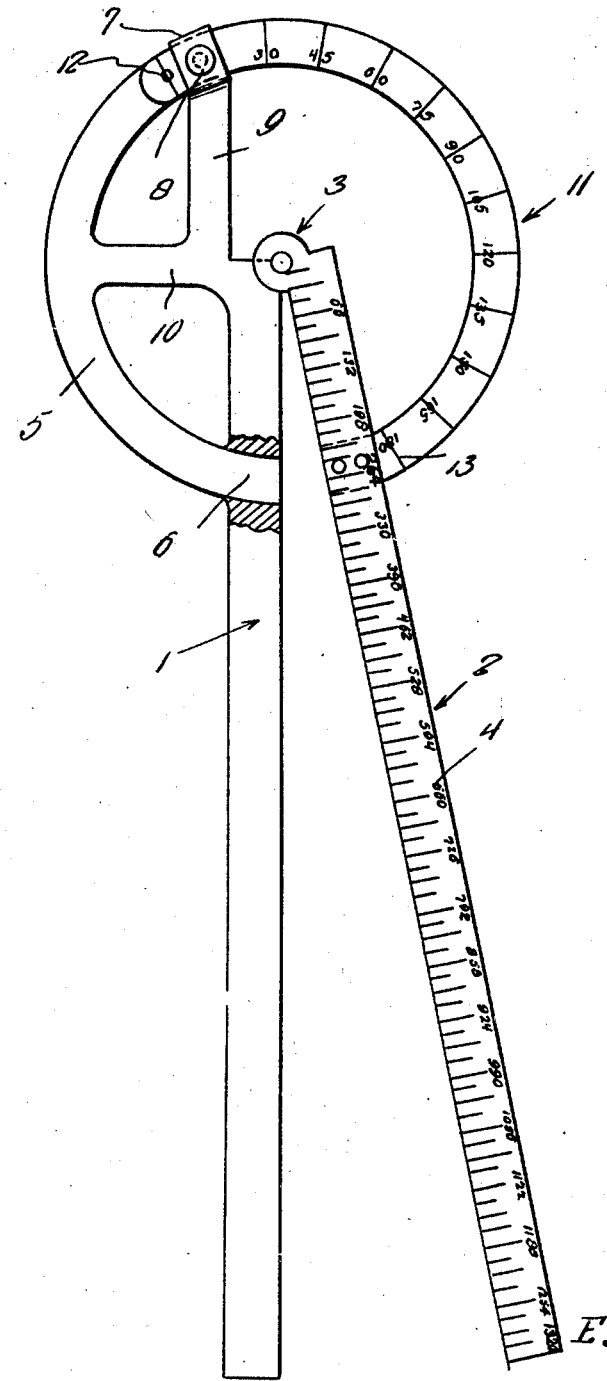
Inventor
E. Tiedemann
By Clarence A. O'Brien
                    Attorney Patented Oct. 22, 1929

1,732,546

UNITED STATES PATENT OFFICE

EUGENE TIEDEMANN, OF MIDDLETON, WISCONSIN

PROTRACTOR

Application filed December 23, 1927. Serial No. 242,157.

This invention relates to an improved measuring instrument especially adapted to be used by surveyors, engineers, architects, and persons in similar capacities for drawing out parcels of land.

Briefly, the instrument comprises a pair of complemental limbs operating as straight edges and hingedly connected together at one end, together with a scale of circular measurements, cooperating with the hingedly connected ends to enable the user to determine readily on the scale of circular measurements, the angularity of the limbs with respect to each other.

The structural features cooperating in producing this improved instrument will become more readily apparent from the following description and drawing.

In the drawing:—

The single figure represents a top plan view, with a portion in section, of a measuring instrument constructed in accordance with the present invention.

As before intimated, the principal parts of the invention, are the limbs 1 and 2 respectively. These are each about ten inches in length and they are hingedly connected at 3. An ordinary carpenter's rule joint is employed for this purpose. These limbs or legs 1 and 2 constitute straight edges, the leg 1 being plain. The companion leg 2 is formed with suitable graduations and indicating numbers as at 4.

Formed integral with the outer end portion of the leg 1 is a segmental concentric track 5 and at the inner end of this and at a point where it joins the legs, is a guide opening 6, and also at the outer end of the guide track 5, is a guide loop 7 carrying a set screw 8. The reference numerals 9 and 10 designate right angularly disposed brace arms connected with the loop 7 and intermediate portion of the track 5 respectively.

The right hand edge of the brace arm 9 is in a substantial line with the left hand edge of the leg 5, to allow the leg 4 to be swung substantially throughout complete half circles.

The leg 4 carries an arcuate measuring arm 11 of semi-circular form which is riveted at its inner end, to the leg 4 at a point spaced away from the hinged joint 3. The free end portion of this arm extends through the guide loop 7 and rides in overlapping position on the track 5, and through the guide opening 6 when an extreme adjustment is made.

The semi-circular measuring arm 11 is provided with radial graduations and indicating numbers beginning at zero as at 12, and ending at 180° as at 13. It is to be added that the two straight edges of the legs are approximately ten inches long, and in accordance with the scale chosen, ten inches represents a quarter of a mile. The straightedges are marked to the scale one-half inch equals 66 feet or one chain. The scale thus represents 1320 feet, one quarter mile or twenty chains.

Each straight edge will be constructed of wood, brass, or steel.

When the legs are closed, the edges are in contact and the scale of circular measurement, has the zero in alinement with a complemental edge of the guide loop, which edge in this instance, operates as an index. As the legs are opened, the circular scale indicates the degree and minutes of an angle.

It is thought that persons skilled in the art to which the invention relates will be able to obtain a clear understanding of the method of using the instrument after considering the detailed description in connection with the drawing. Consequently a more lengthy description is regarded as unnecessary.

Having thus described my invention, what I claim as new is:—

1. In a measuring instrument of the class described, a relatively stationary leg provided adjacent one end with a guide opening, and provided with an integral substantially semi-circular guide track starting at said opening and extending beyond the adjacent end of the leg and terminating in a guide, a companion leg hingedly connected to the first named leg adjacent said track, and a measuring arm of semi-circular form carried by said comparison leg and slidable through said last named guide, upon said track, and through said first-named guide opening, said track and arm being disposed in concentric relation with respect to said connection between said legs.

2. In a measuring instrument of the class described, a relatively stationary leg provided adjacent one end with a transversely disposed guide opening, and formed with an integral substantially semi-circular track having one end in substantial alinement with said opening, said track beng formed at its free end portion with a guide loop, a set screw carried by the guide loop, a brace arm connected with the track and leg, a second leg hingedly connected to the first-named end of said first leg, and provided with a measuring scale, a measuring arm carried by said second leg, said measuring arm being of semi-circular form and having its free end portion extending through said guide loop and capable of riding upon said track into said guide opening when said second leg is moved in a direction away from the first leg, said track and arm being disposed in concentric relation with respect to the hinged connection between said legs.

In testimony whereof I affix my signature.

EUGENE TIEDEMANN.